Figure 1:
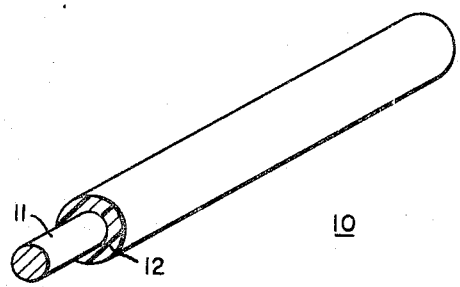

INVENTOR
Frank A. Sattler

United States Patent Office 3,345,429
Patented Oct. 3, 1967

3,345,429
BLENDED POLYESTER WIRE ENAMELS AND CONDUCTORS INSULATED THEREWITH
Frank A. Sattler, Monroeville, Pa., assignor to Westinghouse Electric Corporation, Pittsburgh, Pa., a corporation of Pennsylvania
Filed Aug. 13, 1964, Ser. No. 389,330
12 Claims. (Cl. 260—860)

This invention relates generally to insulating materials for electrical conductors and more specifically to certain blends of polyester resin compositions which are particularly suitable for use as insulating coatings on electrical conductors.

Resinous insulation for electrical conductors, particularly magnet wires, must have outstanding physical, chemical and electrical properties. Among standard industry-wide tests which are employed to determine the properties and suitability of resin insulated conductors or wires for particular applications are tests for flexibility, scrape hardness, repeated abrasion, heat shock, resistance to solvents and thermal stability or thermal life.

Scrape hardness and repeated abrasion tests indicate the ability of the resinous coating to withstand the severe mechanical abuse to which the wire is subjected during winding. Heat shock tests measure the ability of the resinous coating to withstand rapid heating cycles, as for example, those encountered in varnish impregnation of wound coils. The resistance to solvents or boiling toluene test measures the ability of the enamel coating to withstand the attack of hot solvents which the coating encounters in varnish impregnation processes. Thermal stability or thermal life tests determine the ability of resinous insulating coatings to withstand elevated environmental temperatures without degradation. Flexibility tests give an indication of how resinous coating will withstand the mechanical stretching inherent in making tightly wound coils, particularly coils wound on automatic winding equipment.

Abrasion resistance is determined by measuring the number of strokes necessary to penetrate the enamel coating on test samples, using a 740 gram load on a 16 mil diameter knife edge and moving the knife edge back and forth across the sample. Heat shock is determined by winding a wire sample around its own diameter (1X mandrel and heating in an air circulating oven for one hour at various temperatures in 25° C. increments. The temperature at which no failure is apparent is reported, failure constituting any cracks which would be visible to the naked eye. Flexibility is determined by elongating the wire and then wrapping the elongated wire about its own diameter. The maximum elongation which produces no cracking or crazing of the enamel coating is reported. Since the speed at which a wire is coated and cured will influence the flexibility, the flexibility is measured for the baking range in which the wire will pass a 1X mandrel and quick snap test. The thermal stability or thermal life is measured in accordance with the AIEE Test No. 57, 1000-volt criterion in 25° C. increments varying from 175° C. to 250° C.

It is difficult to provide resinous coatings or insulation for electrical conductors which will be outstanding in all of the required or desired properties. Providing a coating composition having one particularly outstanding property may inherently require a compromise on another property. For example, terephthalic and isophthalic acid polyester resin coatings have been employed on electrical conductors because the coatings have an excellent thermal stability or thermal life. The polyester coatings with the highest degree of thermal stability have been those with the highest functionality or degree of cross-linking. These highly functional polyesters have been derived from the reaction of terephthalic and isophthalic acid materials with mixtures of polyols, where the polyol mixtures contain a large amount of compounds having three or more hydroxyl groups. These highly functional polyesters lack the flexibility that is desired for insulated or enameled wires, particularly when these polyesters are modified with metal salts to improve their resistance to abrasion and heat shock. Flexibility is, of course, an important property, particularly when wire is wound into electrical equipment on automatic winding equipment. In the automatic winding equipment, the enameled wire is subjected to elongating strains which may crack or otherwise damage resinous insulating films or enamels with limited or marginal flexibility. It is also desirable to have good properties, particularly flexibility, developed in the coatings over a wide baking range.

Accordingly, it is the general object of this invention to provide novel polyester resin compositions and coatings having excellent thermal stability and heat shock properties together with an improvement in flexibility.

Another object of this invention is to provide electrical conductors having insulated or enameled coatings of polyester blends that may be employed for prolonged periods in environments of elevated temperatures and with sufficient flexibility so that the conductors may be wound into electrical apparatus on automatic winding machines without fear of failures.

Yet another object of this invention is to provide coatings and insulated conductors which may be employed for continuous service at temperatures up to 200° C., the coatings having an improved flexibility over a wide baking range.

Briefly, the present invention accomplishes the above cited objects by blending together, in certain critical proportions outlined in detail hereinbelow, a solution of high functionality terephthalate or isophthalate polyester resin with a solution of a low or intermediate functionality terephthalate or isophthalate polyester resin and employing the blended solution or composition as a coating for electrical conductors. The resulting insulation has the excellent thermal stability and heat shock normally associated with highly functional polyester insulating coatings together with a heretofore unattainable flexibility.

Further objects and advantages of the invention will become apparent as the following description proceeds and features of novelty which characterize the invention will be pointed out in particularity in the claims annexed to and forming a part of this specification.

Figure 2:
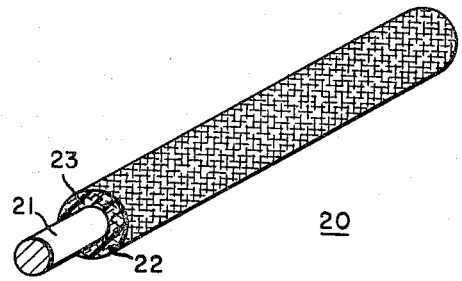

For a better understanding of the invention, reference may be had to the following detailed description and drawing in which:

FIGURE 1 is a fragmentary perspective view of an electrical conductor provided with a polyester coating in accordance with this invention, and FIG. 2 is a fragmentary perspective view of another conductor insulated in accordance with this invention.

It has now been discovered that the flexibility of insulated coatings prepared from terephthalic and isophthalic acid polyesters may be improved by preparing a high functionality polyester and, separately, a low or intermediate functionality polyester and then blending the two together to form a solution of both, employing the solution to coat electrical conductors and heating the deposited coating to cure it to a solid flexible state. By employing such blends, the excellent properties of heat shock and thermal stability or thermal life are attained in combination with a surprising and significant improvement in flexibility. It should be understood that the combination of properties will be realized only if the principles and proportions set forth hereinbelow are followed.

The high functionality or extensively cross-linked polyester resins must be derived from certain proportions of isophthalic acid or lower alkyl derivatives of isophthalic and terephthalic acids in a reaction with polyhydroxy compounds having at least three hydroxyl groups. Optionally, small amounts of dihydroxy compounds may be included but the amount must be limited so that the functionality or cross-linking is not significantly diminished. A mixture of (1) from about 40 to 45 equivalent percent of at least one dicarboxylic material selected from the group consisting of isophthalic acid and the 1 to 4 carbon atom dialkyl esters of isophthalic and terephthalic acids is reacted with (2) from about 55 to 60 equivalent percent of a polyol component, up to 5 equivalent percent of the component being a compound having two hydroxyl groups, the remainder of the polyol component being at least one hydroxy compound having three or more hydroxyl groups.

In addition to isophthalic acid and terephthalic acid, examples of suitable dicarboxylic materials include the lower dialkyl esters of the acids, the alkyl groups having from 1 to 4 carbon atoms thus including the dimethyl, diethyl, dipropyl, dibutyl esters and mixtures thereof. Suitable polyol components with three or more hydroxyl groups include such components as glycerol, trimethylolethane, trimethylolpropane, tris (2-hydroxyethyl) isocyanurate and pentaerythritol. Satisfactory dihydroxy compounds include such compounds as ethylene glycol, 1,4-butanediol, neopentyl glycol, 1,5-pentanediol, 1,6-cyclohexanedimethanol, 2,2,4,4-tetramethyl-1,3-cyclobutanediol, propylene glycol and 4,4'-bis (hydroxymethyl) diphenyl ether.

The lower functionality polyester must also be derived from certain proportions of the heretofore described acids and hydroxy compounds with certain critical amounts of dihydroxy compounds. From (1) about 40 to 45 equivalent percent of at least one dicarboxylic material selected from the group consisting of isophthalic acid and the 1 to 4 carbon atom dialkyl esters of isophthalic and terephthalic acids are reacted with (2) from about 55 to 60 equivalent percent of a polyol component comprising (a) from about 20 to 45 equivalent percent of a dihydroxy compound and (b) from about 10 to 40 equivalent percent of at least one compound having at least three hydroxyl groups.

The term "equivalent percent" as employed herein is calculated according to the following formula:

$$\text{Equivalent Percent of Ingredients} = \frac{\text{No. of Moles of Ingredient} \times \text{Functionality of Ingredient}}{\Sigma (\text{No. of Moles of Ingredient} \times \text{Functionality of Ingredient})}$$

It should be understood that the functional groups in the foregoing reactants are the carboxyl and hydroxyl groups. Therefore, the dicarboxylic acidic compounds and the dihydroxy compounds will be bifunctional while the functionality of the compounds having three or more hydroxyl groups will be equal to the particular number of hydroxyl groups in that compound. Only these reactants are considered in determining equivalent percentages. The denominator in the formula is a sum of the number of moles multiplied by the functionality of each reactant.

As will be more apparent in the examples hereinbelow, a catalyst suitable for use in esterifying the acids and alcohols in preparing the liquid polyester coating composition, may comprise at least one metal salt of organic acids selected from the group consisting of saturated and unsaturated aliphatic acids, cyclic acids and aromatic acids. The esterification catalyst is required when the terephthalates are employed as the acidic component but not when isophthatlic acid or the isophthalates are employed. Examples of suitable catalysts include linoleates, resonates, naphthenates, acetates, benzoates, octoates, tallates, stearates and acetylacetonates of metals including aluminum, calcium, caesium, chromium, cobalt, copper, iron, lead, manganese, nickel, tin, titanium, vanadium, zinc and zirconium. Two or more metal salts may be employed jointly as an esterification catalyst.

A metal catalyst separate and distinct from the hereinbefore described esterification catalyst is added to the liquid resinous polyesters or blends to improve the resistance to heat shock. From 0.1% to about 5%, by weight based on the resin solids, of at least one metal selected from the group consisting of nickel, cobalt and zinc, in the form of a metal salt selected from the group consisting of napthenates, octoates, acetylacetonates and tallates dissolved in a suitable hydrocarbon solvent may be added to the blended liquid polyester coating composition before the composition is applied to conductors.

The polyester blends of this invention may be employed in combination with modifying resinous materials, as for example in combination with blocked polyisocyanates. Blocked polyisocyanates, having the general formula:

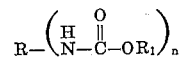

wherein R is a polyvalent organic radical, $n$ is an integer of 3 or more and $R_1$ is a phenyl group of a derivative thereof containing methyl substituents, may be employed in amounts up to about 30 percent, by weight, with the polyester blends to further improve thermal life, with particular improvements with at least about 10 percent of the polyisocyanate. The blocked polyisocyanates may be prepared by methods known in the art, for example by, reacting polyhydric compounds having at least 3 hydroxyl groups with diisocyanates in ratios wherein the ratio of isocyanate/hydroxyl groups is 2/1. The resulting compounds containing 3 or more isocyanate groups may be reacted with phenol derivatives. Examples of materials available by proprietary names include those of Mobay Chemical Company known as Mondur SH, having the formula:

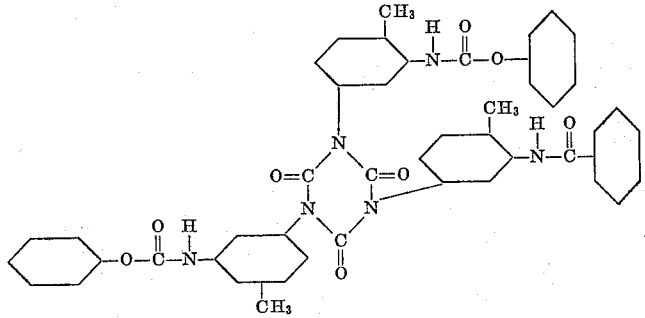

It will be apparent to those skilled in the art, that partially blocked polyisocyanates may also be employed.

It is to be understood that any suitable solvent-diluent system may be employed to thin the resinous polymeric polyester reaction products, blends and modified blends to a suitable wire coating viscosity. Suitable solvents include, for example, cresol, cresylic acid, phenol, phenol derivatives such as amylphenol and parachlorophenol and mixtures thereof. Suitable diluents include aromatic hydrocarbons having a boiling range within the range of from about 130° C. to 300° C. At least one solvent is employed with at least one diluent in a manner known in the art of preparing liquid polyester wire enamels.

The following examples will illustrate the preparation of the polyester reaction products, blends and modified blends and their application to electrical conductors as insulation, in accordance with this invention:

*Example I*

| Material | Grams | Moles | Equivalent Percent |
|---|---|---|---|
| Ethylene glycol | 44.7 | 0.72 | 15.0 |
| Glycerol | 129.0 | 1.4 | 43.6 |
| Dimethylterephthalate | 388.2 | 2.0 | 41.4 |

The foregoing ingredients together with 0.25 gram of lead acetate, 1.5 grams of isopropyl titanate, 60.0 grams of m,p-cresol and 15.0 grams of xylene are heated to 180° C. in a two liter, four neck flask equipment with a stirrer, nitrogen sparge tube, thermometer and steam condenser. The reaction mass is stirred and nitrogen is admitted through the sparging tube. The temperature is increased to 232° C. at a rate of 15° C. per hour. At 232° C., the resinous mass becomes very viscous and thread-forming and 100 grams of m,p-cresol are added. The reaction is continued at 210° C. until a second thread-forming stage is reached and 200 grams of cresylic acid with 37.0 grams of cobalt naphthenate (6% cobalt) are added and the reaction is continued for five minutes at 185° C. The solution is diluted with 310 grams of cresylic acid and 360 grams of an aromatic hydrocarbon with a boiling range of 154° C. to 177° C. This solution is die coated on number 17 AWG (0.045 inch) copper wire to a build of 2.8–3.3 mils with six passes through a 15 foot vertical enameling tower at a hot spot temperature of 430° C. Properties are given in Table I along with those of blended polyester compositions in accordance with this invention. It should be noted that the baking range which produces a coating which will pass the 1X mandrel flexibility test for this material, known in the art, is only 22 feet per minute to 25 feet per minute.

*Example II*

| Part I: Material | Grams | Moles | Equivalent Percent |
|---|---|---|---|
| Glycerol | 184.2 | 2.0 | 60 |
| Dimethylterephthalate | 388.2 | 2.0 | 40 |

The above ingredients together with 3.0 grams of isopropyl titanate, 100 grams of m,p-cresol and 15 grams of xylene are charged to a four neck, two-liter reaction flask equipped with a stirrer, thermometer, steam condenser and nitrogen sparge tube. With stirring and nitrogen sparging, the ingredients are heated to a temperature of 180 to 225° C. until a ball and ring softening temperature of 78° C. (thread-forming stage) is reached. At this point 100 grams of m,p-cresol are added and the reaction continued at 210° C. to a ball and ring softening temperature of 69° C. At this point 550 grams of cresylic acid and 485 grams of an aromatic hydrocarbon having a boiling range of 154° C. to 177° C. are added. This material is retained and employed as outlined hereinbelow in Part II.

| Part II: Material | Grams | Moles | Equivalent Percent |
|---|---|---|---|
| Ethylene glycol | 89.5 | 1.44 | 31.0 |
| Glycerol | 73.6 | 0.8 | 25.8 |
| Dimethylterephthalate | 388.2 | 2.0 | 43.2 |

The above Part II ingredients, together with 0.5 gram of lead acetate, 20.0 grams of m,p-cresol and 15.0 grams of xylene are charged to a four neck, two-liter reaction flask equipped with a stirrer nitrogen sparge tube, steam condenser and thermometer. With stirring and nitrogen sparging, the reactants are heated to 180° C. to 255° C. at a rate of 15° C. per hour until a ball and ring softening temperature of 101° C. is reached. An additional 100 grams of m,p-cresol is added and the reaction is continued at 230° C. to a ball and ring softening temperature of 68° C. At this point, 200 grams of cresylic acid and 74.0 grams of cobalt naphthenate (6% cobalt) are added and the reaction is continued for 5 minutes at 185° C. The solution is diluted with 270 grams of cresylic acid and 235 grams of an aromatic hydrocarbon having a boiling range of 154° C. to 177° C.

The resinous solutions of Part I and Part II are blended together and coated on number 17 AWG wire. The results summarized in Table I illustrate good flexibility over an excellent wide baking range together with satisfactory abrasion resistance, heat shock resistance and outstanding thermal stability.

*Example III*

| Part I: Material | Grams | Moles | Equivalent Percent |
|---|---|---|---|
| Glycerol | 664.0 | 7.2 | 55.0 |
| Ethylene glycol | 59.6 | 0.96 | 4.8 |
| Dimethylterephthalate | 1,552.8 | 8.0 | 40.2 |

The above ingredients, together with 2.0 grams of lead acetate and 400 grams of m,p-cresol are charged into a four neck, 5-liter reaction flask equipped with stirrer, nitrogen sparge tube, steam condenser and thermometer. With stirring and nitrogen sparging, the batch is heated from 160 to 225° C. at a rate of 10° C. per hour and cooked at 225° C. to a thread-forming stage. Four hundred grams of m,p-cresol are added and the reaction is continued at 213° C. to a second thread-forming stage. The batch is then diluted with 2400 grams of cresylic acid, 2010 grams of xylene and 810 grams of 2,2' methylenebis (4-methyl-6-tertiary butyl phenol) (American Cyanamid Antioxident 2246). This solution is blended with the polyester of Part II as outlined hereinbelow.

| Part II: Material | Grams | Moles | Equivalent Percent |
|---|---|---|---|
| Trimethylolpropane | 384.0 | 3.2 | 25.8 |
| Ethylene glycol | 358.0 | 5.76 | 31.0 |
| Dimethylterephthalate | 1,552.8 | 8.0 | 43.2 |

The above ingredients of Part II, together with 2.0 grams of lead acetate and 40.0 grams of m,p-cresol are charged to a 5-liter reaction flask with the associated equipment employed with the reaction flask described in Part I. With stirring and nitrogen sparging, the batch is heated to 160° C., and then from 160° C. to 240° C. at a rate of 10° C. per hour. At 240° C., a thread-forming stage is reached and 400 grams of m,p-cresol are added and the reaction continued at 220° C. to a second thread-forming stage. At this point, 400 grams of cresylic acid and 296 grams of cobalt naphthenate (cobalt) dissolved in 400 grams of cresylic acid are added and the reaction is continued for 5 minutes at 185° C. The solution is then further diluted with 2400 grams of cresylic acid and 2010 grams of xylene and 8.0 grams of the antioxidant employed in Part I.

The hereinabove described Parts I and II are cold blended and coated on number 17 AWG wire. From the results summarized in Table I, it is apparent that excellent properties are attained over a very wide baking range.

*Example IV*

In this example, the procedure and formulations were identical to those described in Example III except that in Part I, 18.8 grams of zinc naphthenate (14.5% zinc)

was substituted for the 2.0 grams of lead acetate and 123.2 grams of zinc naphthenate (14.5% zinc) dissolved in 400 grams of cresylic acid was added to the reacted mixture just before the final dilution and cooked for 5 minutes at 200° C. In Part II, 18.8 grams of zinc naphthenate (14.5% zinc) was substituted for the 2.0 grams of lead acetate and 246.4 grams of zinc naphthenate (14.5% zinc) was substituted for the 296.0 grams of cobalt naphthenate (6% cobalt).

The test results obtained on the coating compositions of this example are summarized in Table I. It is apparent from that summary that good properties are obtained, particularly heat shock resistance which is attributed to the increased metal content. A slight decrease in flexibility is also attributed to the increased metal content. There is, however, a pronounced improvement in flexibility in comparison to equivalent metal contents in polyester compositions not in accordance with this invention.

*Example V*

| Part I: Material | Grams | Moles | Equivalent Percent |
|---|---|---|---|
| Glycerol | 184.2 | 2.0 | 60 |
| Dimethylterephthalate | 58.2 | 0.3 | 6 |
| Isophthalic acid | 282.0 | 1.7 | 34 |

The foregoing ingredients, together with 3.0 grams of isopropyl titanate and 100 grams of m,p-cresol are charged to a four neck, 2-liter reaction flask equipped with a nitrogen sparge tube, steam condenser, motor stirrer and thermometer. With nitrogen sparging and stirring, heat is applied and the temperature is increased from 170 to 218° C. at a rate of 10° C. per hour. At 218° C., a thread-forming stage is reached and 100 grams m,p-cresol are added and the reaction continued at 206° C. to a second thread-forming stage. At this point, 100 grams of m,p-cresol are added and the reaction is continued at 201° C. to a third-forming stage. One hundred grams of cresylic acid are added together with 30.8 grams of zinc naphthenate (14.5% zinc) dissolved in 100 grams of cresylic acid and the reaction is continued at 200° C. for 5 minutes. The solution is then diluted with 500 grams of cresylic acid and 520 grams of xylene with an addition of 2.0 grams of the antioxidant described in Example III. This solution is blended with that prepared in Part II hereinbelow.

| Part II: Material | Grams | Moles | Equivalent Percent |
|---|---|---|---|
| Ethylene glycol | 89.3 | 1.44 | 31.2 |
| Trimethylolethane | 96.0 | 0.8 | 25.8 |
| Dimethylterephthalate | 58.2 | 0.3 | 6.5 |
| Isophthalic acid | 282.0 | 1.7 | 36.5 |

In equipment identical to that described in Part I hereinabove, the foregoing ingredients together with 3.0 grams of isopropyl titanate are heated from 170 to 240° C. at a rate of 10° C. per hour to a thread-forming stage. After an addition of 100 grams of m,p-cresol, the reaction is continued at 235° C. to a second thread-forming stage wherein additional 100 grams of m,p-cresol are added. The reaction is continued at 220° C. to a third thread-forming stage when 100 grams of cresylic acid and 61.6 grams of zinc naphthenate (14.5% zinc) dissolved in 100 grams of cresylic acid are added and the reaction continued for 5 minutes at 200° C. The batch is diluted with 400 grams of cresylic acid and 500 grams of xylene with an addition of 2.0 grams of the antioxidant described in Example III.

The solutions of Part I and Part II described hereinabove are blended and the resulting blended solution is die coated on number 17 AWG copper wire. It is apparent from the summary of results in Table I that good properties are obtained. Again, an improvement in flexibility as comparred to similar formulations simultaneously reacted together in a single vessel is apparent. It should be noted that isophthalate polyester resins generally show better flexibility and poorer heat shock resistance than the corresponding terephthalate polyester resins.

*Example VI*

In this example, the procedures and formulations were identical to that described in Example II except that in Part I, 522.4 grams (2.0 moles) of tris (2-hydroxyethyl) isocyanurate was substituted for the glycerol, a final reaction temperature of 200° C. was employed for the first and second thread-forming stages and final dilution was made with 470 grams of cresylic acid and 405 grams of the aromatic hydrocarbon described therein. In Part II, 209 grams of tris (2-hydroxyethyl) isocyanurate (0.8 mole) was substituted for the glycerol. Three thread-forming stages were reached at 225° C., 230° C. and 230° C. with 100 grams of m,p-cresol additions after each stage. Final dilution was made with 400 grams of cresylic acid and 600 grams of the aromatic hydrocarbon described therein.

The solutions of Parts I and II were blended at room temperature and coated on number 17 AWG copper wire. The summary of results listed in Table I show excellent flexibility over a wide baking range together with good abrasion resistance and heat shock and outstanding thermal stability.

*Example VII*

Three components are blended together in this example to provide a modified polyester blend. The Part I composition herein was identical to Part I of Example VI. The Part II composition herein was identical to Part II of Example VI except that the cobalt naphthenate content was reduced from 74.0 grams to 14.4 grams. The Part III component was prepared by dissolving 335 grams of the cyclic trimer of tolylene diisocyanate end-blocked with 3 moles of cresol in 335 grams of cresylic acid. Parts I, II, and III were blended together and applied to number 17 AWG wire in accordance with prior procedures. The test results summarized in Table I show a good flexibility over a relatively wide baking range, good thermal stability, excellent abrasion resistance and heat shock resistance.

*Example VIII*

| Part I: Material | Grams | Moles | Equivalent Percent |
|---|---|---|---|
| Tris (2-hydroxyethyl) isocyanurate | 261.2 | 1.0 | 30 |
| Glycerol | 92.1 | 1.0 | 30 |
| Dimethylterephthalate | 194.1 | 1.0 | 20 |
| Isophthalic acid | 166.1 | 1.0 | 20 |

The foregoing ingredients together with 0.5 gram of lead isopropyl titanate, 100 grams of m,p-cresol and 10 grams of xylene are charged to a four neck, 2-liter reaction flask equipped with a motor stirrer, nitrogen sparge tube, thermometer and steam condenser. With stirring and nitrogen sparging, the mixture is heated and a rate of 10° C. per hour is maintained from 170° C. to 230° C. until a thread-forming stage is reached. After the addition of 100 grams of m,p-cresol, the reaction is continued at 218° C. to a second thread-forming stage when 470 grams of cresylic acid and 405 grams of the aromatic hydrocarbon described in Example II are added. This solution is blended with the solution of Part II in accordance with the description below.

| Part II: Material | Grams | Moles | Equivalent Percent |
| --- | --- | --- | --- |
| Ethylene glycol | 89.5 | 1.44 | 31.0 |
| Tris (2-hydroxyethyl) isocyanurate | 104.5 | 0.4 | 13.0 |
| Glycerol | 36.8 | 0.4 | 13.0 |
| Dimethylterephthalate | 194.1 | 1.0 | 21.5 |
| Isophthalic acid | 166.1 | 1.0 | 21.5 |

The foregoing ingredients together with 0.5 grams of lead acetate, 20.0 grams of m,p-cresol and 10.0 grams of xylene are charged to a reaction vessel similar to that employed in Part I and heated, maintaining a 15° C. per hour rate over the range of 170 to 260° C., until a thread-forming stage is reached. At this point, 100 grams of m,p-cresol are added and the reaction is continued at 238° C. until a second thread-forming stage is reached. At this point 100 grams of cresylic acid together with 82.0 grams of cobalt naphthenate (6% cobalt) dissolved in the cresylic acid are added. After heating for 5 minutes at 185° C., the reaction product is diluted with 400 grams of cresylic acid and 600 grams of the aromatic hydrocarbon described in Example II together with 2.0 grams of the antioxidant described in Example III.

Parts I and II are cold blended and the solution is die coated on number 17 AWG copper wire in accordance with procedures described hereinabove. The summary of results in Table I show an excellent flexibility over a relatively wide baking range with good abrasion and heat shock resistance.

TABLE I

| Example | Baking Range | Flexibility, Percent | Abrasion Resistance | Heat Shock, ° C. | Thermal Life, hrs. at— | | | |
| --- | --- | --- | --- | --- | --- | --- | --- | --- |
| | | | | | 250° C. | 225° C. | 200° C. | 175° C. |
| I | 22-25 | 10-15 | 80-180 | 150 | | | | |
| II | 17-32 | 10-30 | 90-200 | 150 | 170 | 3,366 | 16,200 | |
| III | 15-32 | 15-30 | 40-70 | 150 | 182 | 1,404 | 8,434 | >20,000 |
| IV | 15-28 | 10-25 | 60-80 | 175 | 137 | 1,712 | 8,064 | >20,000 |
| V | 15-32 | 20-30 | 30-78 | 150 | 110 | 961 | 9,442 | >20,000 |
| VI | 15-32 | 30+ | 40-160 | 150 | 1,680 | >2,980 | | |
| VII | 15-28 | 15-30 | 110-225 | 175 | 288 | >910 | | |
| VIII | 15-28 | 30+ | 44-130 | 150 | 264 | >910 | | |

The polyester blends and wire enamel solutions of this invention may be coated on wire comprised of copper, aluminum, nickel, and silver either alone or as plated or clad combinations or alloys as well as nickel-chromium alloys, stainless steel alloys, anodized aluminum or the like, to provide a high temperature insulating coating therefor with excellent flexibility over a wide baking range.

Referring now to FIG. 1 of the drawings, there is illustrated a conductor 10 comprising a copper conductor 11 coated with a hard, tough, solid resinous insulating coating 12 produced by applying a solution of the polyester blends or modified polyester blends of this invention thereto and curing the applied coating by heat treatment. It will be understood that the coating 12 may be applied by any suitable means, such as dipping, die coating or the like. Conductor 10, while described as being copper may be of any other metal or alloy, as described hereinabove. After curing by heating, coating 12 adheres tenaciously to the conductor 11. While the conductor 11 is illustrated as being circular in cross-section, it will be understood that it may be of any other desirable cross-section such as rectangular, square, flat strip or the like. Fillers may be included in the coating 12. Examples of suitable fillers include finely divided silica, mica, iron oxide, hydrated alumina, titanium dioxide, or the like.

The enamels of the present invention may also be applied to electrical conductors in combination with coatings of both organic and inorganic fibrous materials. One form of such a modification is illustrated as insulated conductor 20 in FIG. 2. A copper wire 21 is provided with an exterior coating 22 of fibrous material, which may be glass fibers, asbestos fibers, paper, cotton, silk or the like either wrapped or braided or woven thereabout or various combinations thereof. A quantity of the enamel 23 of this invention is impregnated into the fibrous coating 22 and baked to provide a composite insulation about copper wire 21.

It should also be understood that the polyester blends and modified polyester blends of this invention may be employed as either an undercoating or an overcoating in conductors insulated with composite resinous coatings. For example, the insulating coatings of this invention may be employed as an undercoating with an overcoating of a thin film of a linear polyethylene terephthalate resin.

While there have been shown and described what are at present considered to be the preferred embodiments of the invention, modifications thereof will readily occur to those skilled in the art. It is not desired, therefore, that the invention be limited to the specific arrangements shown and described and it is intended to cover in the appended claims all such modifications as fall within the true spirit and scope of the invention.

I claim:

1. A polyester resin insulating composition consisting essentially of a blended solution of (A) a highly functional polyester derived by heating to esterify a mixture of (1) from about 40 to 45 equivalent percent of at least one dicarboxylic material selected from the group consisting of isophthalic acid and the 1 to 4 carbon atom dialkyl esters of isophthalic and terephthalic acids and (2) from about 55 to 60 equivalent percent of a polyol component, up to 5 equivalent percent of the polyol component being a compound having two hydroxyl groups, the remainder of the polyol component being at least one compound having at least three hydroxyl groups and (B) a polyester having a substantially lower functionality than the said highly functional polyester, the lower functionality polyester being derived by heating to esterify a mixture of (1) from about 40 to 45 equivalent percent of at least one dicarboxylic material selected from the group consisting of isophthalic acid and the 1 to 4 carbon atom dialkyl esters of isophthalic and terephthalic acids and (2) from about 55 to 60 equivalent percent of a polyol component comprising (a) from about 20 to 45 equivalent percent of a compound having two hydroxyl groups and (b) from about 10 to 40 equivalent percent of at least one compound having at least three hydroxyl groups, the components (A) and (B) being blended in proportion to provide a dihydroxy compound content within the range of about 8 to 20 equivalent percent, based on the total polyester blend of components (A) and (B).

2. A polyester resin insulating composition consisting essentially of a blended solution of (A) a highly functional polyester derived by heating to esterify a mixture of (1) from about 40 to 45 equivalent percent of dimethylterephthalate and (2) from about 55 to 60 equivalent percent of a polyol component, up to 5 equivalent percent of a dihydroxy compound selected from the groups consisting of ethylene glycol, 1,4-butanediol, 1,5-pentanediol, 1,4-cyclohexanedimethanol and 4,4'-bis (hydroxymethyl) diphenyl ether the remainder of the polyol component being at least one material selected from the group consisting of glycerol, trimethylolethane, tris (2-hydroxyether) isocyanurate, trimethylolpropane and pentaerythritol and (B) a polyester having a substantially lower functionality than the said highly functional polyester, the lower functionality polyester being derived by heating to esterify a mixture of (1) from about 40 to 45 equivalent percent of dimethylterephthalate and (2) from about 55 to 60 equivalent percent of a polyol component comprising (a) from about 20 to 45 equivalent percent of a dihydroxy compound selected from the group consisting of ethylene glycol, 1,4-butanediol, 1,5-pentanediol, 1,4-cyclohexanedimethanol and 4,4'-bis (hydroxymethyl) diphenyl ether and (b) from about 10 to 40 equivalent percent of at least one material selected from the group consisting of glycerol, trimethylolethane, tris (2-hydroxymethyl) isocyanurate, trimethylolpropane and pentaerythritol, the components (A) and (B) being blended in proportions to provide a dihydroxy compound content within the range of about 8 to 20 equivalent percent, based on the total polyester blend of components (A) and (B).

3. A polyester resin insulating composition consisting essentially of a blended solution of (A) a highly functional polyester derived by heating to esterify a mixture of (1) from about 40 to 45 equivalent percent of dimethylterephthalate and (2) from about 55 to 60 equivalent percent of a polyol component, up to 5 equivalent percent of the polyol component being ethylene glycol, the remainder being glycerol and (B) a polyester having a substantially lower functionality than the said highly functional polyester, the lower functionality polyester being derived by heating to esterify a mixture of (1) from about 40 to 45 equivalent percent of dimethylterephthalate and (2) from about 55 to 60 equivalent percent of a polyol component comprising (a) from about 20 to 45 equivalent percent of ethylene glycol and (b) from about 10 to 40 equivalent percent of glycerol, the components (A) and (B) being blended in proportions to provide a glycol content within the range of about 8 to 20 equivalent percent, based on the total polyester blend of components (A) and (B).

4. A polyester resin insulating composition consisting essentially of a modified polyester blend solution of from about 70 to 90 percent, by weight, of (I) (A) a highly functional polyester derived by heating to esterify a mixture of (1) from about 40 to 45 equivalent percent of at one dicarboxylic material selected from the group consisting of isophthalic acid and the 1 to 4 carbon atom dialkyl esters of isophthalic and terephthalic acids and (2) from about 55 to 60 equivalent percent of a polyol component, up to 5 equivalent percent of the polyol component being a compound having two hydroxyl groups, the remainder of the polyol component being at least one material having at least three hydroxyl groups and (B) a polyester having a substantially lower functionality than the said highly functional polyester, the lower functionality polyester being derived by heating to esterify a mixture of (1) from about 40 to 45 equivalent percent of at least one dicarboxylic material selected from the group consisting of isophthalic acid and the 1 to 4 carbon atom dialkyl esters of isophthalic and terephthalic acids and (2) from about 55 to 60 equivalent percent of a polyol component comprising (a) from about 20 to 45 equivalent percent of a compound having two hydroxyl groups and (b) from about 10 to 40 equivalent percent of at least one material having at least three hydroxyl groups, the components (A) and (B) being present in proportions to provide dihydroxy compound content within the range of about 8 to 20 equivalent percent, based on the total polyester blend of components (A) and (B) up to about 30 percent, by weight of (II) a blocked polyisocyanate having the general formula:

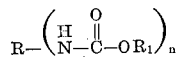

wherein R is a polyvalent organic radical, $n$ is an integer of 3 or more and $R_1$ is a phenyl group or a derivate thereof containing methyl substituents.

5. A polyester resin insulating composition consisting essentially of a modified polyester blend solution of from about 70 to 90 percent, by weight, of (I) (A) a highly functional polyester derived by heating to esterify a mixture of (1) from about 40 to 45 equivalent percent of dimethylterephthalate and (2) from about 55 to 60 equivalent percent of a polyol component, up to 5 equivalent percent of the polyol component being ethylene glycol, the remainder of the polyol component being glycerol and (B) a polyester having a substantially lower functionality than the said highly functional polyester, the lower functionality polyester being derived by heating to esterify a mixture of (1) from about 40 to 45 equivalent percent of dimethylterephthalate and (2) from about 55 to 60 equivalent percent of a polyol component comprising (a) from about 20 to 45 equivalent percent of ethylene glycol and (b) from about 10 to 40 equivalent percent of at least one alcohol selected from the group consisting of trimethylolethane and glycerol, the components (A) and (B) being present in proportions to provide glycol content within the range of about 8 to 20 equivalent percent, based on the total polyester blend of components (A) and (B) and (II) up to 30 percent, by weight, of the cyclic trimer of tolylene disocyanate end-blocked with three moles of cresol.

6. A polyester resin insulating composition consisting essentially of a modified polyester blend solution of from about 70 to 90 percent, by weight, of (I) (A) a highly functional polyester derived by heating to esterify a mixture of (1) from about 40 to 45 equivalent percent of at least one dicarboxylic material selected from the group consisting of dimethylterephthalate and isophthalic acid and (2) from about 55 to 60 equivalent percent of a polyol component, up to 5 equivalent percent of the polyol being a dihydroxy compound selected from the group consisting of ethylene glycol, 1,4-butanediol, 1,5-pentanediol, 1,4-cyclohexanedimethanol and 4,4'-bis(hydroxymethyl) diphenyl ether, the remainder of the polyol component being at least one polyol selected from the group consisting of glycerol, trimethylolethane, tris (2-hydroxyethyl) isocyanurate, trimethylolpropane and pentaerythritol and (B) a polyester having a substantially lower functionality than the said highly functional polyester, the lower functionality polyester being derived by heating a mixture of (1) from about 40 to 45 equivalent percent of at least one dicarboxylic material selected from the group consisting of isophthalic acid and dimethylterephthalate and (2) from about 55 to 60 equivalent percent of a polyol component comprising (a) from about 20 to 45 equivalent percent of a dihydroxy compound selected from the group consisting of ethylene glycol, 1,4-butanediol, 1,5-pentanediol, 1,4-cyclohexanedimethanol and 4,4-bis (hydroxymethyl) diphenyl ether and (b) from about 10 to 40 equivalent percent of at least one compound selected from the group consisting of glycerol, trimethylolethane, tris (2-hydroxyethyl) isocyanurate, trimethylolpropane and pentaerythritol, the components (A) and (B) being present in proportions to provide a dihydroxy compound content within the range of about 8 to 20 equivalent percent, based on the total polyester blend of components (A) and (B) and (II) up to 30 percent, by weight, of the cyclic trimer of tolylene diisocyanate end-blocked with three moles of cresol.

7. An insulated electrical conductor comprising, in combination, an electrically conductive metallic member coated with a cured polyester resin produced by heating a blended solution consisting essentially of (A) a highly functional polyester derived by heating to esterify a mixture of (1) from about 40 to 45 equivalent percent of at least one dicarboxylic material selected from the group consisting of isophthalic acid and the 1 to 4 carbon atom dialkyl esters of isophthalic and terephthalic acids and (2) from about 55 to 60 equivalent percent of a polyol component, up to 5 equivalent percent of the polyol component being a compound having two hydroxyl groups, the remainder of the polyol component being at least one compound having at least three hydroxyl groups and (B) a polyester having a substantially lower functionality than the said highly functional polyester, the lower functionality polyester being derived by heating to esterify a mixture of (1) from about 40 to 45 equivalent percent of at least one dicarboxylic material selected from the group consisting of isophthalic acid and the 1 to 4 carbon atom dialkyl esters of isophthalic and terephthalic acids and (2) from about 55 to 60 equivalent percent of a polyol component comprising (a) from about 20 to 45 equivalent percent of a dihydroxy compound and (b) from about 10 to 40 equivalent percent of at least one compound having at least three hydroxyl groups, the components (A) and (B) being blended in proportions to provide a dihydroxy compound content within the range of about 8 to 20 equivalent percent, based on the total polyester blend of components (A) and (B).

8. An insulated electrical conductor comprising, in combination, an electrically conductive metallic member coated with a cured polyester resin produced by heating a blended solution consisting essentially of (A) a highly functional polyester derived by heating to esterify a mixture of (1) from about 40 to 45 equivalent percent of dimethylterephthalate and (2) from about 55 to 60 equivalent percent of a polyol component, up to 5 equivalent percent of the polyol being the diol ethylene glycol, the remainder of the polyol component being at least one material selected from the group consisting of glycerol, trimethylolethane, tris (2-hydroxyethyl) isocyanurate, trimethylolpropane and pentaerythritol and (B) a polyester having a substantially lower functionality than the said highly functional polyester, the lower functionality polyester being derived by heating to esterify a mixture of (1) from about 40 to 45 equivalent percent of dimethylterephthalate and (2) from about 55 to 60 equivalent percent of a polyol component comprising (a) from about 20 to 45 equivalent percent of a diol selected from the group consisting of ethylene glycol, 1,4-butanediol, 1,5-pentanediol, 1,4-cyclohexanedimethanol and 4,4'-bis (hydroxymethyl) diphenyl ether and (b) from about 10 to 40 equivalent percent of at least one material selected from the group consisting of glycerol, trimethylolethane, tris (2-hydroxymethyl) isocyanurate, trimethylolpropane and pentaerythritol, the components (A) and (B) being blended in proportions to provide a diol content within the range of about 8 to 20 equivalent percent, based on the total polyester blend of components (A) and (B).

9. An insulated electrical conductor comprising, in combination, an electrically conductive metallic member coated wtih a cured polyester resin produced by heating a blended solution consisting essentially of (A) a highly functional polyester derived by heating to esterify a mixture of (1) from about 40 to 45 equivalent percent of dimethylterephthalate and (2) from about 55 to 60 equivalent percent of an alcohol, up to 5 equivalent percent of the alcohol being ethylene glycol, the remainder being glycerol and (B) a polyester having a substantially lower functionality than the said highly functional polyester, the lower functionality polyester being derived by heating to esterify a mixture of (1) from about 40 to 45 equivalent percent of dimethylterephthalate and (2) from about 55 to 60 equivalent percent of a polyol component comprising (a) from about 20 to 45 equivalent percent of ethylene glycol and (b) from about 10 to 40 equivalent percent of glycerol, the components (A) and (B) being blended in proportions to provide a glycol content within the range of about 8 to 20 equivalent percent, based on the total polyester blend of components (A) and (B).

10. An insulated electrical conductor comprising, in combination, an electrically conductive metallic member coated with a cured modified polyester blend resin produced by heating a blended solution consisting essentially of from about 70 to 90 percent, by weight, of (I)(A) a highly functional polyester derived by heating to esterify a mixture of (1) from about 40 to 45 equivalent percent of at least one dicarboxylic material selected from the group consisting of isophthalic acid and the 1 to 4 carbon atom dialkyl esters of isophthalic and terephthalic acids and (2) from about 55 to 60 equivalent percent of a polyol component, up to 5 equivalent percent of the polyol component being a compound having two hydroxyl groups, the remainder of the polyol component being at least one material having at least three hydroxyl groups and (B) a polyester having a substantially lower functionality than the said highly functional polyester, the lower functionality polyester being derived by heating to esterify a mixture of (1) from about 40 to 45 equivalent percent of at least one dicarboxylic material selected from the group consisting of isophthalic acid and the 1 to 4 carbon atom dialkyl esters of isophthalic and terephthalic acids and (2) from about 55 to 60 equivalent percent of a polyol component comprising (a) from about 20 to 45 equivalent percent of a compound having two hydroxyl groups and (b) from about 10 to 40 equivalent percent of at least one material having at least three hydroxyl groups, the components (A) and (B) being present in proportions to provide a dihydroxy compound content within the range of about 8 to 20 equivalent percent, based on the total polyester blend of components (A) and (B) and (II) up to 30 percent, by weight, of a blocked polyisocyanate having the general formula:

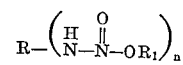

wherein R is a polyvalent organic radical, $n$ is an integer of 3 or more and $R_1$ is a phenyl group or a derivative thereof containing methyl substituents.

11. An insulated electrical conductor comprising, in combination, an electrically conductive metallic member coated with a cured modified polyester resin produced by heating a blended solution consisting essentially of from about 70 to 90 percent, by weight, of (I) (A) a highly functional polyester derived by heating to esterify a mixture of (1) from about 40 to 45 equivalent percent of dimethylterephthalate and (2) from about 55 to 60 equivalent percent of a polyol component, up to 5 equivalent percent of the polyol component being ethylene glycol, the remainder of the polyol component being glycerol and (B) a polyester having a substantially lower functionality than the said highly functional polyester, the lower functionality polyester being derived by heating to esterify a mixture of (1) from about 40 to 45 equivalent percent of dimethylterephthalate and (2) from about 55 to 60 equivalent percent of a polyol component comprising (a) from about 20 to 45 equivalent percent of ethylene glycol and (b) from about 10 to 40 equivalent percent of at least one alcohol selected from the group consisting of trimethylolethane and glycerol, the components (A) and (B) being present in proportions to provide an ethylene glycol content within the range of about 8 to 20 equivalent percent, based on the total polyester of components (A) and (B) and (II) up to 30 percent, by weight, of the cyclic trimer of tolylene diisocyanate end-blocked with three moles of cresol.

12. An insulated electrical conductor comprising, in combination, an electrically conductive metallic member coated with a cured modified polyester resin produced by heating a blended solution consisting essentially of from about 70 to 90 percent, by weight, of (I) (A) a highly functional polyester derived by heating to esterify a mixture of (1) from about 40 to 45 equivalent percent of at least one dicarboxylic material selected from the group consisting of dimethylterephthalate and isophthalic acid and (2) from about 55 to 60 equivalent percent of a polyol component, up to 5 equivalent percent of the polyol being a dihydroxy compound selected from the group consisting of ethylene glycol, 1,4-butanediol, 1,5-pentanediol, 1,4-cyclohexanedimethylol and 4,4'-bis (hydroxymethyl) diphenyl ether, the remainder of the polyol being at least one polyol selected from the group consisting of glycerol, trimethylolethane, tris (2-hydroxyethyl) isocyanurate, trimethylolpropane and pentaerythritol and (B) a polyester having a substantially lower functionality than the said highly functional polyester, the lower functionality polyester being derived by heating to esterify a mixture of (1) from about 40 to 45 equivalent percent of at least one dicarboxylic material selected from the group consisting of isophthalic acid and dimethylterephthalate and (2) from about 55 to 60 equivalent percent of a polyol component comprising (a) from about 20 to 45 equivalent percent of a dihydroxy compound selected from the group consisting of ethylene glycol, 1,4-butanediol, 1,5-pentanediol, 1,4-cyclohexanedimethanol and 4,4-bis (hydroxymethyl) diphenyl ether and (b) from about 10 to 40 equivalent percent of at least one compound selected from the group consisting of glycerol, trimethylolethane, tris (2-hydroxyethyl) isocyanurate, trimethylolpropane and pentaerythritol, the components (A) and (B) being present in proportions to provide a dihydroxy compound content within the range of about 8 to 20 equivalent percent, based on the total polyester blend of components (A) and (B) and (II) up to 30 percent, by weight, of the cyclic trimer of tolylene diisocyanate end-blocked with three moles of cresol.

References Cited

UNITED STATES PATENTS

| | | | |
|---|---|---|---|
| 2,936,296 | 5/1960 | Precopio et al. | 260—33.4 |
| 3,122,451 | 2/1964 | Bunge et al. | 117—232 |
| 3,161,541 | 12/1964 | Holub | 117—232 |
| 3,240,626 | 3/1966 | Olsen et al. | 117—218 |

FOREIGN PATENTS

| | | |
|---|---|---|
| 1,338,149 | 8/1963 | France. |
| 960,966 | 6/1964 | Great Britain. |

MURRAY TILLMAN, *Primary Examiner.*

J. T. GOOLKASIAN, *Assistant Examiner.*